United States Patent
Moon et al.

(10) Patent No.: US 9,100,119 B2
(45) Date of Patent: Aug. 4, 2015

(54) APPARATUS AND METHOD FOR MULTIPORT AMPLIFICATION IN COMMUNICATION SYSTEM

(75) Inventors: Seong-Mo Moon, Daejeon (KR); Dong-Hwan Shin, Daejeon (KR); In-Bok Yom, Daejeon (KR); Moon-Que Lee, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 192 days.

(21) Appl. No.: 13/542,888

(22) Filed: Jul. 6, 2012

(65) Prior Publication Data

US 2013/0259107 A1 Oct. 3, 2013

(30) Foreign Application Priority Data

Apr. 2, 2012 (KR) .................. 10-2012-0034039

(51) Int. Cl.
*H04L 27/20* (2006.01)
*H04B 17/13* (2015.01)
*H04B 7/185* (2006.01)
*H04B 7/204* (2006.01)

(52) U.S. Cl.
CPC ............ *H04B 17/13* (2013.01); *H04B 7/18515* (2013.01); *H04B 7/2041* (2013.01)

(58) Field of Classification Search
CPC .............. H04B 17/00; H04B 17/0017; H04B 17/0027; H04B 17/001; H04B 7/2041; H04B 7/18515
USPC .......................... 375/308, 302, 295, 316, 219
See application file for complete search history.

(56) References Cited

U.S. PATENT DOCUMENTS 7,822,147 B2 10/2010 Huang et al.
2004/0222849 A1* 11/2004 Doi .......................... 330/124 R
(Continued)

FOREIGN PATENT DOCUMENTS

JP 08-265381 A 10/1996
KR 100758302 B 9/2007

OTHER PUBLICATIONS

Seong-Mo Moon et al; "Adaptive Amplitude and Phase Calibration of Multi-Port Amplifier Using Modified Six-Port Demodulator", 17th Ka and Broadband Communications Navigation and Earth Observation Conference, Oct. 5, 2011; 10 pages.
Zhiwen Zhu, et al; "Ka-band Multi-port Power Amplifier Calibration Experiment and Results", 2010 Second International Conference on Advances in Satellite and Space Communications, Oct. 2010; pp. 11-14.

*Primary Examiner* — Zewdu Kassa
(74) *Attorney, Agent, or Firm* — Ladas & Parry LLP (57) ABSTRACT

Disclosed is an apparatus and a method for multiport amplification configured to amplify a signal input to a multi-input port and output the amplified signal to a multi-output port in order to normally transmit/receive a signal in a communication system. The apparatus and the method are configured to: amplify an input signal input through a multi-input port, detect a phase error and an amplitude error of the input signal, and then calculate a phase error value and an amplitude error value of the input signal; correct the phase error and the amplitude error of the input signal through the phase error value and the amplitude error value of the input signal; and then amplify the input signal of which the phase error and the amplitude error are corrected, and output the input signal to a multi-output port.

18 Claims, 10 Drawing Sheets

(56) References Cited

U.S. PATENT DOCUMENTS

| | | |
|---|---|---|
| 2007/0127599 A1 | 6/2007 | Song et al. |
| 2010/0156528 A1 | 6/2010 | Couchman et al. |
| 2011/0267141 A1* | 11/2011 | Hangai et al. .................. 330/84 |

* cited by examiner

APPARATUS AND METHOD FOR MULTIPORT AMPLIFICATION IN COMMUNICATION SYSTEM

CROSS-REFERENCE TO RELATED APPLICATIONS

The present application claims priority of Korean Patent Application No. 10-2012-0034039, filed on Apr. 2, 2012, which is incorporated herein by reference in its entirety.

BACKGROUND OF THE INVENTION

1. Field of the Invention

Exemplary embodiments of the present invention relate to a communication system, and more particularly, to an apparatus and a method for multiport amplification in a communication system configured to amplify signals to output the signals through a multi-output port by amplifying the signals input through a multi-input port in order to normally transmit/receive the signal in a communication system.

2. Description of Related Art

A study for providing users with services with various quality of services (hereinafter, referred to as 'Qos') having a high transmission speed has actively conducted at the present time in communication system. Further, a study of methods for transmitting large-capacity data stably and at a high speed through limitative sources has been actively conducted in the communication systems. In particular, methods for more improving data transmission efficiency when transmitting data through a wireless channel have been proposed for communication systems.

Meanwhile, recently, methods of transmitting/receiving a signal to transmit/receive by using a multi-beam to more improve data transmission efficiency have been proposed. In particular, in a multi-beam antenna system configured to be able to provide narrow beams having high antenna gain within a service coverage by transmitting/receiving signals by using a multi-beam, signals to be transmitted/received through a multi-beam is amplified by using a multiport amplifier that can control output power in accordance with operation conditions.

The multi-beam antenna system using the multiport amplifier has the advantage of providing communication and broadcasting services by locating several spot beams in the service area, and of adaptably providing high power assignment for areas requiring higher effective isotropic radiated power (hereinafter, referred to as 'EIRP') due to rain or a rapid increase in communication service. Further, in the satellite communication system, a satellite repeater configured to relay a signal transmitted from a satellite bundles and uses high-power amplifiers in a row, and provides communication and broadcasting services in the service area by amplifying the signal transmitted from the satellite with the high-power amplifiers bundled in a row.

However, a detailed method allowing a satellite repeater in present communication systems, for example, a satellite communication system, to amplify a signal to transmit/receive through a multi-beam by using high-power amplifiers has not been proposed. For example, a detailed method of allowing a satellite repeater to amplify a signal for amplifying a signal input through a multi-input port and outputting the signal to a multi-output port by using a multiport amplifier, when a signal is transmitted/received through a multi-beam in a satellite communication system has not been proposed.

Therefore, as described above, a method of amplifying a signal, corresponding to a multiport to normally transmit/receive a signal through a wireless channel is required for a communication system configured to transmit/receive a signal through a multi-beam. In particular, when a signal transmitted/received through the multi-beam is relayed through a satellite relaying device in a communication system, for example, a satellite communication system, a method of amplifying a signal through a multiport for outputting the signal to a multi-output port after amplifying the signal input through a multi-input port such that the signal transmitted/received through the multi-beam is normally transmitted/received is required.

SUMMARY OF THE INVENTION

An embodiment of the present invention is directed to provide an apparatus and a method for multiport amplification of a signal in a communication system.

Further, an embodiment of the present invention is directed to provide an apparatus and a method for multiport amplification configured to amplify a signal input through a multi-input port and to output the signal to a multi-output port in order to normally transmit/receive the signal through a multi-beam in a communication system configured to transmit/receive a signal through a multi-beam.

Further, an embodiment of the present invention is directed to provide an apparatus and a method for multiport amplification configured to amplify a signal such that the signal is normally transmitted/received, by correcting a phase error and an amplitude error of the signal amplified through multiport amplification, in a communication system configured to transmit/receive a signal through a multi-beam.

An apparatus for multiport amplification configured to amplify a signal in a communication system, includes: an amplifying unit configured to amplify an input signal input through a multi-input port and output the amplified signal to a multi-output port; a calculating unit configured to detect a phase error and an amplitude error of the input signal and calculate a phase error value and an amplitude error value of the input signal; and a correcting unit configured to correct the phase error and the amplitude error of the input signal through the phase error value and the amplitude error value of the input signal, in which the amplifying unit amplifies the input signal of which the phase error and the amplitude error are corrected, and outputs the input signal to the multi-output port.

A method for multiport amplification configured to amplify a signal in a communication system, includes: amplifying an input signal input through a multi-input port, detecting a phase error and an amplitude error of the input signal, and then calculating a phase error value and an amplitude error value of the input signal; correcting unit the phase error and the amplitude error of the input signal through the phase error value and the amplitude error value of the input signal; and amplifying the input signal of which the phase error and the amplitude error are corrected, and outputting the input signal to a multi-output port.

According to the present invention, it is possible to normally transmit/receive a signal transmitted through a multi-beam by amplifying the signal, corresponding the a multi-input port, in a communication system configured to transmit/receive a signal through the multi-beam. In particular, according to the present invention, in a communication system, a signal transmitted/received through a multi-beam is normally relayed and received by correcting a phase error and am amplitude error of an amplified signal and by outputting the signal to a multi-output port after amplifying the signal input through a multi-input port, when a signal transmitted/received through the multi-beam is amplified, thereby expending the service area.

DESCRIPTION OF SPECIFIC EMBODIMENTS

Hereinafter, exemplary embodiments of the present invention will be described in detail with reference to the accompanying drawings. It should be noted that, in the following description, only the parts required for understanding the operation according to embodiments of the present invention are described and the other description is not provided in order to make the spirit of the present invention unclear.

The present invention proposes an apparatus and a method for multiport amplification configured to amplify a signal in a communication system, for example, a communication system transmitting/receiving a signal through a multi-beam. Although embodiments of the present invention are described by exemplifying a communication system configured to transmit/receive a signal through a multi-beam herein, the amplification method proposed in the present invention may be applied to other types of communication systems.

Further, embodiments of the present invention propose an apparatus and a method for multiport amplification configured to amplify a signal to normally transmit/receive the signal by amplifying a signal transmitted/received through a multi-beam in a communication system. In embodiment of the present invention described herein, a signal is normally transmitted/received through a multi-beam by amplifying a signal input through a multi-input port and outputting the signal to a multi-output port. In embodiments of the present invention, a signal transmitted/received through a multi-beam is normally relayed and transmitted/received by correcting a phase error and am amplitude error of an amplified signal and by outputting the signal to a multi-output port after amplifying the signal input through a multi-input port, when a signal transmitted/received through the multi-beam is amplified. Hereinafter, an apparatus for multiport amplification in a communication system in accordance with an embodiment of the present invention will be described in more detail with reference to FIG. 1.

Figure 1:
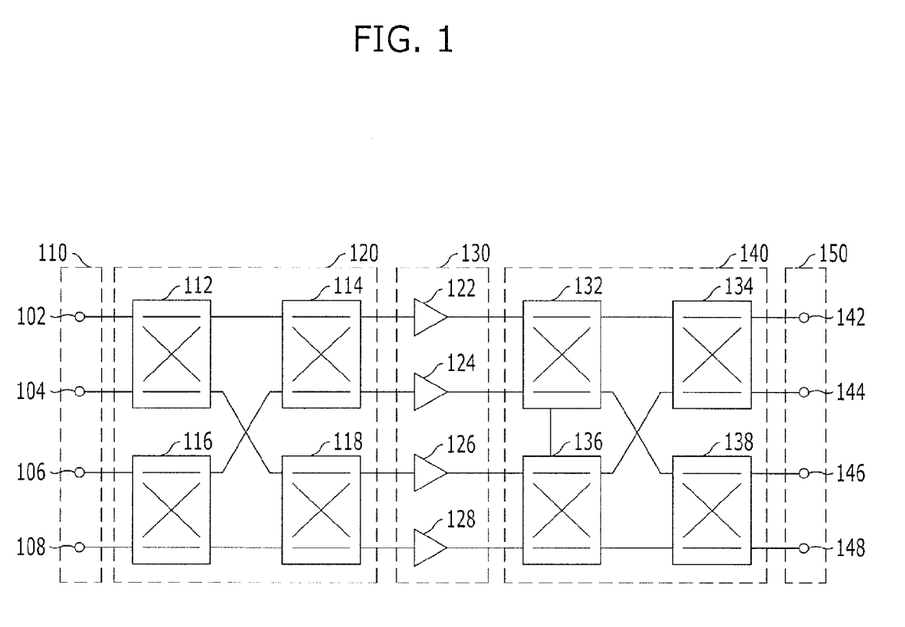
FIG. 1 is a diagram schematically illustrating the structure of an apparatus for multiport amplification in a communication system in accordance with an embodiment of the present invention.

FIG. 1 is a diagram schematically illustrating the structure of an apparatus for multiport amplification in a communication system in accordance with an embodiment of the present invention. FIG. 1 is a diagram schematically illustrating the structure of an apparatus for multiport amplification using a 4×4 multiport in a communication system in accordance with an embodiment of the present invention.

Referring to FIG. 1, the apparatus for multiport amplification configured to amplify a signal input through a multi-input port 110, for example, an input port 1 102, an input port 2 104, an input port 3 106, and an input port 4 108 and then output the amplified signal through a multi-output port 150, for example, an output port 1 142, an output port 2 144, an output port 3 146, and an output port 4 148.

Describing in more detail, the apparatus for multiport amplification configured to include an input hybrid network unit 120 configured to transmit a signal input through the multi-input port 110 to an amplifying unit 130 for multiport amplification, the amplifying unit configured to amplify the signal input through the input hybrid network unit 120, and an output hybrid network unit 140 configured to transmit the amplified signal to the multi-output port 150 such that the signal amplified through the amplifying unit 130 is output through the multi-output port 150.

Figure 2:
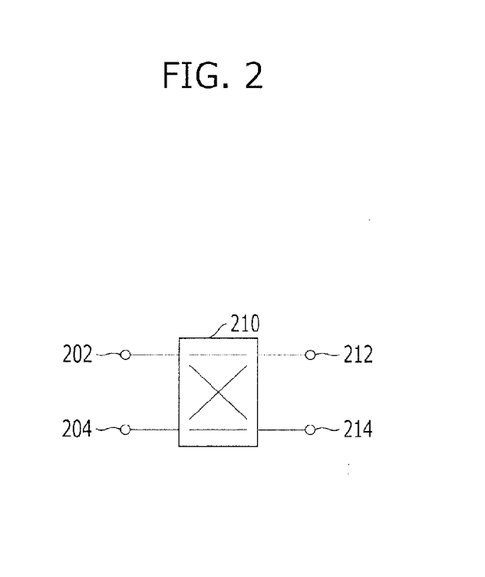
FIG. 2 is a diagram schematically illustrating the structure of a hybrid unit of the apparatus for multiport amplification in a communication system in accordance with an embodiment of the present invention.

Here, the input hybrid network unit 120 includes a plurality of hybrid units, for example, a hybrid unit 1 112, a hybrid unit 2 114, a hybrid unit 3 116, and a hybrid unit 4 118, and the output hybrid network unit 140 also includes a plurality of hybrid units, similar to the input hybrid network 120, for example, a hybrid unit 1 132, a hybrid unit 2 134, a hybrid unit 3 136, and a hybrid unit 4 138. Further, each hybrid unit 210 of the input hybrid network unit 120 and the output hybrid network unit 140, as illustrated in FIG. 2, includes two input ports, that is, an input port 1 202 and an input port 2 204, and two output ports, that is, an output port 1 212 and an output port 2 214. FIG. 2 is a diagram schematically illustrating the structure of a hybrid unit of the apparatus for multiport amplification in a communication system in accordance with an embodiment of the present invention.

Further, in the hybrid unit 210, a signal is input to the input port 1 202, the magnitude of the input signal is reduce by half and signals having a phase difference of 90 degrees are output to the first output port 212 and the second output port 214. Further, in the hybrid unit 210, a signal is input to the input port 2 204, the magnitude of the input signal is reduce by half and signals having a phase difference of 90 degrees are output to the output port 1 212 and the output port 2 214. That is, the hybrid unit 210 outputs the signals input through the input ports 202 and 204 as signals having a reduced magnitude by half and a phase difference of 90 degrees through the output ports 212 and 214.

Further, the amplifying unit 130 includes a plurality of amplifiers configured to amplify signals output from the output ports of the hybrid unit 2 114 and the hybrid unit 4 118 of the input hybrid network unit 120, for example, an amplifier 1 122, an amplifier 2 124, an amplifier 3 126, and an amplifier 4 128. Here, signals having a magnitude of a half the magnitude of the signal input to the multi-input port 110 and having predetermined difference phase differences are input to the amplifiers 122, 124, 126, and 128 and the amplifiers 122, 124, 126, and 128 amplify the input signals to a predetermined level and transmit the signals to the output hybrid network unit 140, thereby outputting the signals through the multi-output port 150.

For example, when an input signal with a predetermined frequency is input to the input port 1 102 of the multi-input port 110, the hybrid unit 1 112 of the input hybrid network unit 120 outputs a first signal having a magnitude of a half the magnitude of the input signal and having the same phase as that of the input signal to the hybrid unit 2 114, and outputs a second signal having a magnitude of a half the magnitude of the input signal and a phase different of 90 degrees from the input signal, that is, a phase difference of 90 degrees from the first signal to the hybrid unit 4 118. Further, when the first signal is input, the hybrid unit 2 114 outputs a third signal having a magnitude of a half the magnitude of the first signal and having the same phase as the first signal to the amplifier 1 122 of the amplifying unit 130, and outputs a fourth signal a magnitude of a half the magnitude of the first signal and having a phase difference of 90 degrees from the first signal to the amplifier 2 124 of the amplifying unit 130. Further, when the second signal is input, the hybrid unit 4 118 outputs a fifth signal having a magnitude of a half the magnitude of the second signal and having the same phase as the second signal to the amplifier 3 126 of the amplifying unit 130, and outputs a sixth signal a magnitude of a half the magnitude of the second signal and having a phase difference of 90 degrees from the second signal to the amplifier 4 128 of the amplifying unit 130.

Here, the third signal has the same phase as the input signal, that is, the phase difference is 0 degree, the fourth signal and the fifth signals have a phase difference of 90 degrees from the input signal, and the sixth signal has a phase difference of 180 degrees from the input signal. Further, the third to sixth signals have the same magnitude, for example, a magnitude of a quarter of the input signal. Further, when the third to sixth signals are input, the amplifiers 122, 124, 126, and 128 amplify input signals to have phase differences of 0 degree, 90 degrees, 90 degrees, and 180 degrees from the input signal from the input signal, respectively, and the same magnitude, and output the signals to the output hybrid network unit 140.

When the third signal amplified is input from the amplifier 1 122, the hybrid unit 1 132 of the output hybrid network unit 140 outputs a seventh signal having a magnitude of a half the magnitude of the amplified third signal and having the same phase as the amplified third signal to the hybrid unit 2 134, and outputs an eight signal having a magnitude of a half the magnitude of the amplified third signal and having a phase difference of 90 degrees from the amplified third signal to the hybrid unit 138. Further, when a fourth signal amplified is input from the amplifier 2 124, the hybrid unit 1 132 outputs a ninth signal having a magnitude of a half the magnitude of the amplified fourth signal and having a phase difference of 90 degrees from the amplified fourth signal to the hybrid unit 2 134, and outputs a tenth signal having a magnitude of a half the magnitude of the amplified fourth signal and having the same phase as the amplified fourth signal to the hybrid unit 4 138. Here, the seventh signal and the ninth signal input to the hybrid unit 2 134 have inverse phases to each other and are offset, and the eighth signal and the tenth signal input to the hybrid unit 4 138 have the same phase of which the phase difference from the input signal is 90 degrees, thus the signals are reinforced.

Further, when the fifth signal amplified is input from the amplifier 3 126, the hybrid unit 3 136 of the output hybrid network unit 140 outputs an eleventh signal having a magnitude of a half the magnitude of the amplified fifth signal and having the same phase as the amplified fifth signal to the hybrid unit 2 134, and outputs a twelfth signal having a magnitude of a half the magnitude of the amplified fifth signal and having a phase difference of 90 degrees from the amplified fifth signal to the hybrid unit 4 138. Further, when a sixth signal amplified is input from the amplifier 4 128, the hybrid unit 3 136 outputs a thirteenth signal having a magnitude of a half the magnitude of the amplified sixth signal and having a phase difference of 90 degrees from the amplified sixth signal to the hybrid unit 2 134, and outputs a fourteenth signal having a magnitude of a half the magnitude of the amplified sixth signal and having the same phase as the amplified sixth to the hybrid unit 4 138. Here, the eleventh signal and the thirteenth signal input to the hybrid unit 2 134 have inverse phases to each other and are offset, and the twelfth signal and the fourteenth signal input to the hybrid unit 4 138 have the same phase of which the phase difference from the input signal is 90 degrees, thus the signals are reinforced.

That is, only signals that are all offset are input to the hybrid unit 2 134, such that an input signal input through the input port 1 102 is not output through the output port 1 142 and the output port 2 144. Further, a first reinforcing signal reinforced by the eighth signal and the tenth signal and a second reinforcing signal reinforced by the twelfth signal and the fourteenth signal is input to the hybrid unit 4 138.

When the first reinforcing signal and the second reinforcing signal are input, the hybrid unit 4 138 outputs a third reinforcing signal having magnitude of a half the magnitude of the first reinforcing signal and having the same phase as that of the first reinforcing signal to the output port 3 146, and outputs a fourth reinforcing signal having a magnitude of a half the magnitude of the first reinforcing signal and having a phase difference of 90 degrees from the first reinforcing signal to the output port 4 148. Further, the hybrid unit 4 138 outputs a fifth reinforcing signal having a magnitude of a half the magnitude of the second reinforcing signal and having a phase difference of 90 degrees from the second reinforcing signal to the output port 3 146 and outputs a sixth reinforcing signal having a magnitude of a half the magnitude of the second reinforcing signal and having the same phase from the second reinforcing signal to the output port 4 148.

Here, the third reinforcing signal and the fifth reinforcing signal output to the output port 3 146 have inverse phases to each other and are offset, and the fourth reinforcing signal and the sixth reinforcing signal output to the output port 4 148 have the same phase having a phase difference of 180 degrees from the input signal and are reinforced. That is, the input signal input through the input port 1 102 is amplified and then output through the output port 4 148, as an output port having a phase difference of 180 degrees from the input signal.

In the apparatus for multiport amplification, as described, a plurality of hybrid units are included in the input hybrid network unit 120 and the output hybrid network unit 140, a magnitude error and a phase error of output signals may be generated in the hybrid units and the output signals do not have inverse phases or same phases therebetween by the magnitude error and the phase error in the hybrid units, so that a phase error and an amplitude error are generated in the signal amplified in signal amplification, and thus there is a limit in normally transmitting/receiving a signal through a multi-beam. Therefore, in the embodiment of the present invention, a signal is amplified by correcting the phase error and the amplitude error of the amplified signal when a signal is amplified in the apparatus for multiport amplification. Hereinafter, an apparatus configured to amplify a signal by correcting a phase error and an amplitude error of an amplified signal in a communication system according to an embodiment of the present invention will be described in more detail with reference to FIG. 3.

Figure 3:
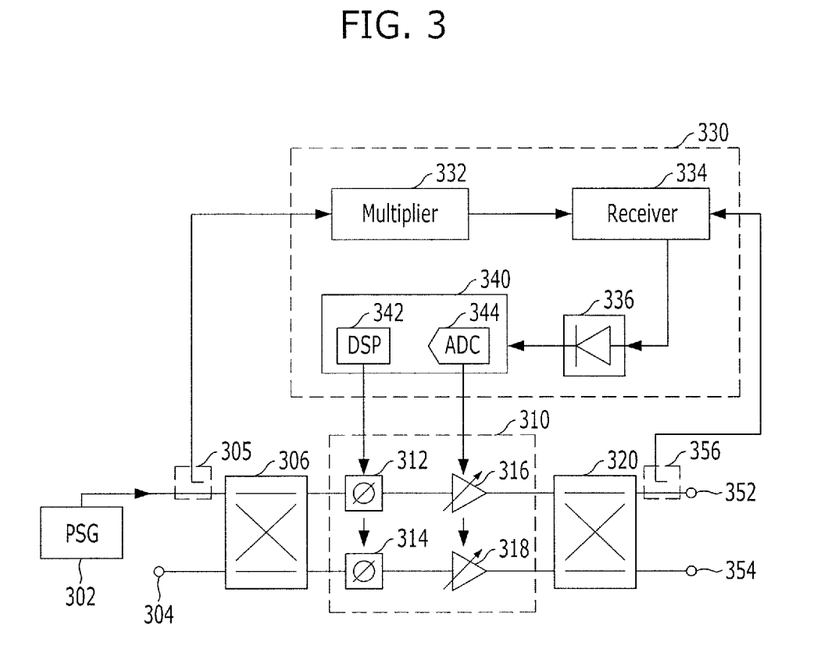
FIG. 3 is a diagram schematically illustrating the structure of an apparatus for multiport amplification in a communication system in accordance with another embodiment of the present invention.

FIG. 3 is a diagram schematically illustrating the structure of an apparatus for multiport amplification in a communication system in accordance with another embodiment of the present invention. Here, FIG. 3 is a diagram schematically illustrating the structure of an apparatus for multiport amplification using a 2×2 multiport in a communication system in accordance with another embodiment of the present invention.

Referring to FIG. 3, the apparatus for multiport amplification includes a multi-input port, for example, an input port 1 and an input port 2 304, and a multi-output port, for example, an output port 1 352 and an output port 2 354, in which a signal, which is output from a PSG (Pilot Signal Generator) 302 configured to generate an input signal having a predetermined frequency, is input to the input port 1 as an input signal.

Further, the apparatus for multiport amplification includes an input hybrid unit 306 configured to multiport-amplify and transmit a signal input through the multi-input port to an amplifying unit (not illustrated), an output hybrid unit 320 configured to output the amplified signal to the multi-output port when the signal input through the input hybrid unit 306 is amplified, a correcting unit 310 configured to correct a phase error and an amplitude error of an output signal of the input hybrid unit 306, and a calculating unit 330 configured to calculate a phase error and an amplitude error of an output signal of the input hybrid unit 306. In this configuration, the calculating unit 330 calculates a phase error and an amplitude error of the output signal of the input hybrid unit 306 in a heterodyne type based on a multiplicative mixing type.

Describing in more detail, the calculating unit 330 includes a multiplier 332 configured to perform down conversion on an input signal of the input hybrid unit 306, a heterodyne receiver 334 configured to receive the down-converted input signal output from the multiplier 332 and an output signal of the output hybrid unit 320 and then heterodyne-convert the signals, a detecting unit 336 configured to output the heterodyne-detected signal through the heterodyne conversion, and an output unit 340 configured to output a correction signal for the phase error and the amplitude error of the output signal of the input hybrid unit 306 through the heterodyne-detected signal. In this configuration, the output unit 340 includes an DSP (Digital Signal Processor) 342 configured to output a correction signal for the phase error of the output signal of the input hybrid unit 306 and an ADC (Analog to Digital Converter) 344 configured to output a correction signal for the amplitude error of the output signal of the input hybrid unit 306.

In this configuration, the multiplier 332 receives the output signal of the input hybrid unit 306 through a coupler 1 305 and the heterodyne receiver 334 receives the output signal of the output hybrid unit 320 through couplers, for example, receives the output signal of the output port 1 352 through a coupler 2 356, as a null point where an ideal output signal is not output from the output ports 352 and 354 of the output hybrid unit 320.

Further, the correcting unit 310 includes phase regulators 312 and 314 configured to receive the correction signal for the phase error of the output signal of the input hybrid unit 306 and correct the phase error, for example, phase shifters, and variable amplifiers 316 and 318 configured to receive the correction signal for the amplitude error of the output signal of the input hybrid unit 306 and correct the amplitude error, for example, variable gain amplifiers (hereinafter, referred to as a 'VGA').

The apparatus for multiport amplification detects the signal magnitude of the null point where an ideal output signal is not output, in the output ports 352 and 354 of the output hybrid unit 320, and then correct the phase error and the amplitude error by sequentially generating correction signals for correcting the phase error and the amplitude error according to the detection, in the calculating unit 330. In this configuration, since the phase error and the amplitude error are not accurately checked in accordance with the signal magnitude of the null point, as described above, the phase error and the amplitude error are sequentially corrected, so that it take considerable time to correct the phase error and the amplitude error and the correction range for the phase error and the amplitude error may be reduced in accordance with the detected signal magnitude. Therefore, in the embodiment of the present invention, the phase error and the amplitude error of a signal generated in signal amplification in accordance with multiport amplification in a communication system are easily and accurately corrected. Hereinafter, an apparatus for multiport amplification in a communication system in accordance with another embodiment of the present invention will be described in more detail with reference to FIG. 4.

Figure 4:
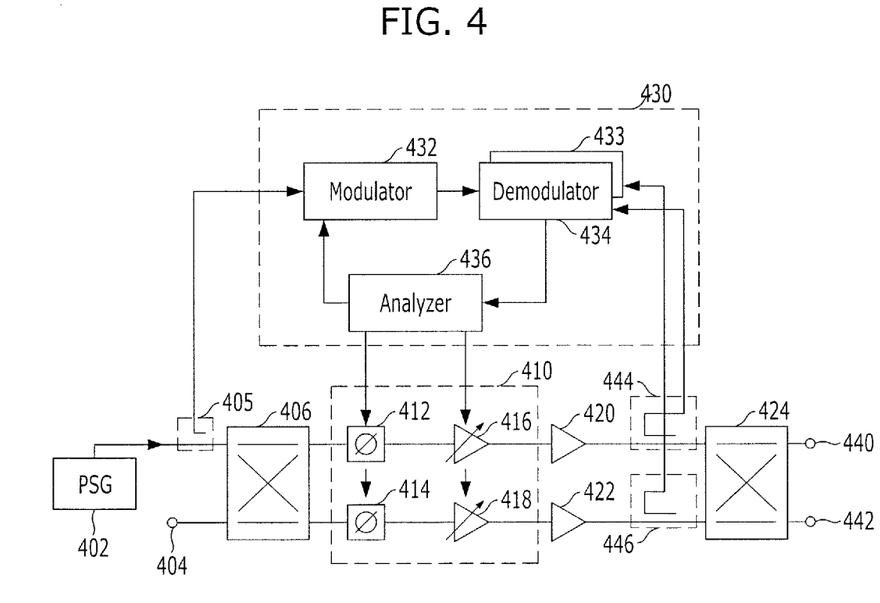
FIG. 4 is a diagram schematically illustrating the structure of an apparatus for multiport amplification in a communication system in accordance with another embodiment of the present invention.

FIG. 4 is a diagram schematically illustrating the structure of an apparatus for multiport amplification in a communication system in accordance with another embodiment of the present invention. Here, FIG. 4 is a diagram schematically illustrating the structure of an apparatus for multiport amplification using a 2×2 multiport in a communication system in accordance with another embodiment of the present invention.

Referring to FIG. 4, the apparatus for multiport amplification includes a multi-input port, for example, an input port 1 and an input port 2 404, and a multi-output port, for example, an output port 1 440 and an output port 2 442, in which a signal, which is output from a PSG 402 configured to generate an input signal having a predetermined frequency, is input to the input port 1 as an input signal.

Further, the apparatus for multiport amplification includes an input hybrid unit 406 configured to multipart-amplify and transmit a signal input through the multi-input port to an amplifiers, for example amplifier 1 420 and an amplifier 2 422, amplifiers 420 and 422 configured to amplify a signal input through the input hybrid unit 406 at a predetermined level, an output hybrid unit 424 configured to transmit the amplified signal to the output ports 440, 442 such that the signals amplified through the amplifiers 420 and 422 are output through the multi-output port, a correcting unit 410 configured to correct a phase error and an amplitude error of an output signal of the input hybrid unit 406, and a calculating unit 430 configured to calculate a phase error and an amplitude error of an output signal of the input hybrid unit 406.

In this configuration, the calculating unit 430 calculates a phase error and an amplitude error of an output signal of the input hybrid unit 406 by using multiplicative mixing type that combines a signal having a predetermined phase transition with a pilot signal modulated by a predetermined modulation type, for example a QPSK (Quadrature Phase Shift Keying) modulation type.

Describing in more detail, the calculating unit 430 configured to include a modulator 432 configured to output a pilot signal by modulating an input signal of the input hybrid unit 406 in a predetermined modulation type, for example QPSK modulation type, a plurality of demodulators, for example, a demodulator 1 433 and a demodulator 2 434, configured to receive the pilot signal output from the modulator 432 and an input signal of the output hybrid unit 424 and demodulate the input signal of the output hybrid unit 424, that is, the signals amplified and output from the amplifiers 420 and 422 in a predetermined demodulation type, for example, a BPSK (Binary Phase Shift Keying) modulation type, and an analyzer 436 configured to compare the QPSK signal detected in accordance with the demodulation in the demodulators 433 and 434 with the pilot signal and detect a phase error and an amplitude error of the output signal of the input hybrid unit 406.

In this configuration, the calculating unit 430 receives the output signal of the input hybrid unit 406 through a coupler 1 405 and the demodulators 43 and 434 receive the input signal of the output hybrid unit 424, that is, the amplified signals output from the amplifiers 420 and 422 through the couplers, for example, a coupler 2 444 and a coupler 3 446.

The modulator 432, as described above, modulates the input signal of the input hybrid 406, that is, an original signal to be amplified by the apparatus for multiport amplification in the QPSK modulation type and outputs a pilot signal, that is, the QPSK signal to the demodulators 433 and 434. Further, the demodulators 433 and 434 receive the pilot signal, that is the QPSK signal from the modulator 432, and receive the input signal of the output hybrid unit 424, that is, the amplified signal output from the amplifiers 420 and 422. Further, the demodulators 433 and 434 demodulate the input signal of the output hybrid unit 424, that is, the amplified signals output from the amplifiers 420 and 422 in the BPSK demodulate type, and detects a QPSK signal from the input signal of the output hybrid unit 424.

In this configuration, the modulator 432 and the demodulators 433 and 434 perform sampling on the input signal of the output hybrid unit 424 and the input signal of the input hybrid unit 406 through the modulation and demodulation described above, into an I signal and a Q signal, and output the signals. Further, the QPSK signal output from the modulator 432 is input to the analyzer 436 and the modulator 432 and the detected QPSK signals output from the demodulators 433 and 434 are input to the analyzer 436.

Further, not the QPSK signals, but a sine signal and a cosine signal may be output from the modulator 432 and the demodulators 433 and 434 and input to the analyzer 436 and the modulator 432. That is, the sine signal and the cosine signal output from the modulator 432 are input to the analyzer 436 and the modulator 432 and the detected sine signal and cosine signal output from the demodulators 433 and 434 are input to the analyzer 436.

Figure 5:
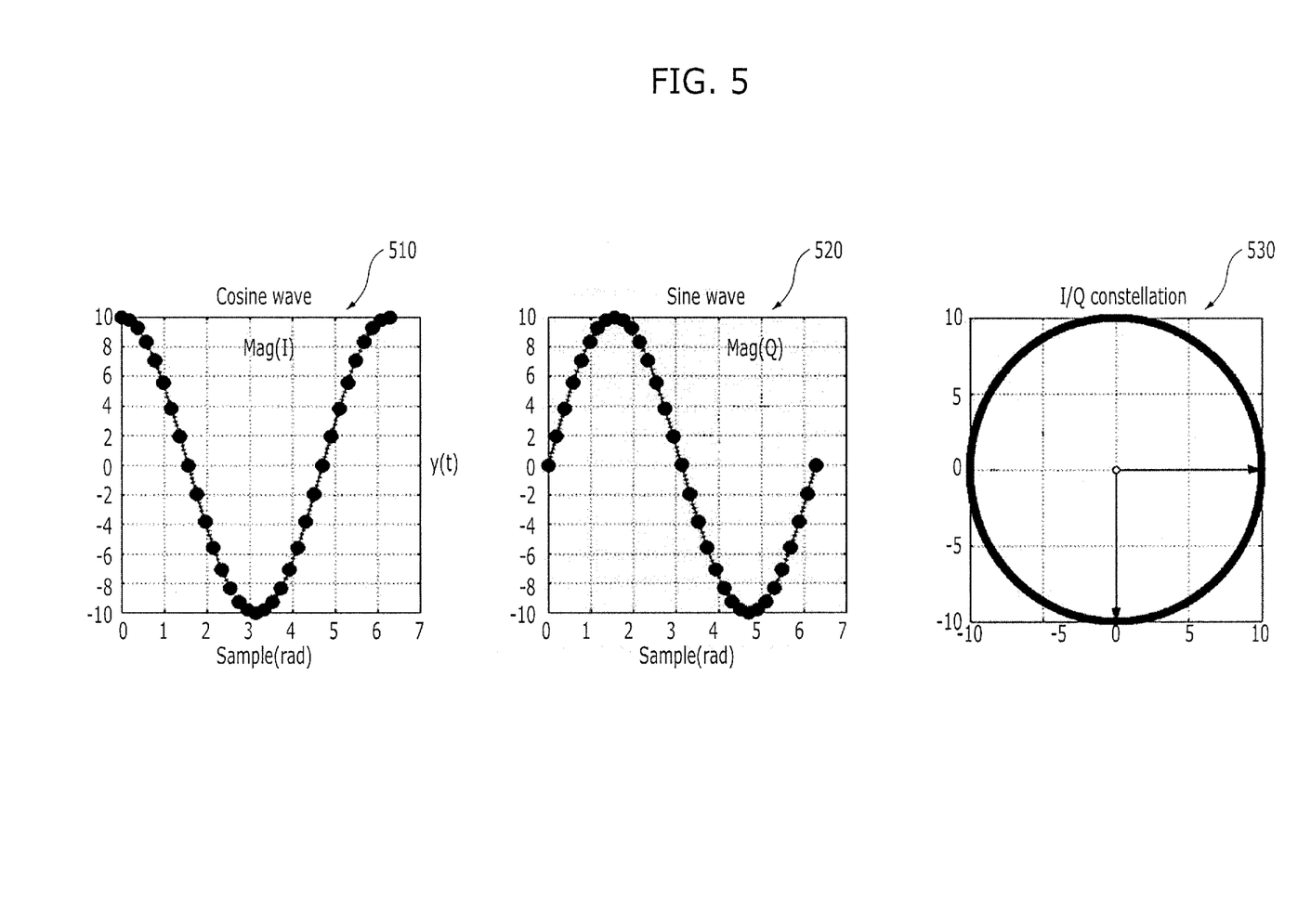
FIGS. 5 and 6 are diagrams schematically illustrating signals input to an analyzer of the structure of an apparatus for multiport amplification in a communication system in accordance with an embodiment of the present invention.
Figure 6:
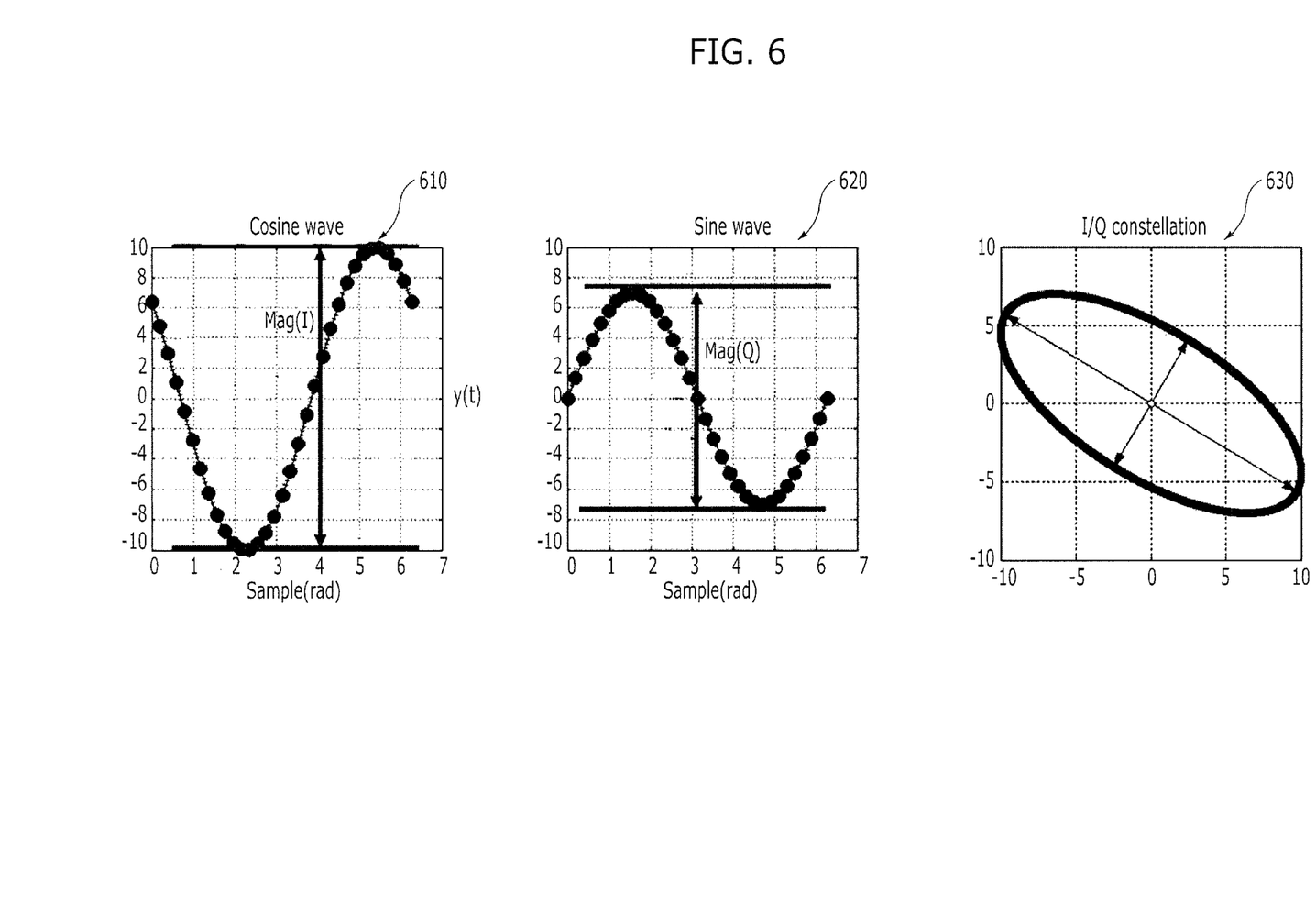

In this configuration, the sampled I signal and Q signal, that is, the QPSK signal, sine signal, cosine signal output from the modulator 432 and input to the analyzer 436 are as those illustrated in FIG. 5, and the sampled I signal and Q signal, that is, the QPSK signal, sine signal, and cosine signal output from the demodulators 433 and 434 and input to the analyzer 436 are as those illustrated in FIG. 6. FIGS. 5 and 6 are diagrams schematically illustrating signals input to an analyzer of the structure of an apparatus for multiport amplification in a communication system in accordance with an embodiment of the present invention.

That is, in FIG. 5, reference numeral '510' indicates the cosine signal of the I signal output from the modulator 432, reference numeral '520' indicates the sine signal of the Q signal output from the modulator 432, and reference numeral '530' indicates the QPSK signals of the I signal and the Q signal output from the modulator 432, that is, the constellation of the I signal and the Q signal according QPSK. Further, in FIG. 6, reference numeral '610' indicates the cosine signal of the I signal output from the demodulators 433 and 434, reference numeral '620' indicates the sine signal of the Q signal output from the demodulators 433 and 434, and reference numeral '630' indicates the QPSK signals of the I signal and the Q signal output from the demodulator 433 and 434, that is, the constellation of the I signal and the Q signal according QPSK. In this configuration, the cosine signal of the I signal, the sine signal of the Q signal, and the QPSK signals of the I signal and the Q signal, which are output from the modulator 432 and the demodulators 433 and 434 are selectively input to the analyzer 436, and the analyzer 436 detects the phase error and the amplitude error by comparing the cosine signal of the I signal, the sine signal of the Q signal, and the QPSK signal of the I signal and the Q signal that are input, and calculates a phase error value and an amplitude error value.

Further, the analyzer 436 detects the phase error and the amplitude error of the output signal of the input hybrid unit 406, as described above, by comparing the QPSK signal output from the modulator 432 with the QPSK signals detected by the demodulators 433 and 434, or comparing the sine signal and the cosine signal output from the modulator 432 with the sine signal and the cosine signal detected by the demodulators 433 and 434. In other words, the analyzer 436 detects the phase error and the amplitude error of the output signal of the input hybrid unit 406, by comparing sampled I signal and Q signal of the input signal of the input hybrid unit 406 output through the modulator 432 with the sampled I signal and Q signal of the input signal of the output hybrid unit 424 output through the demodulators 433 and 434. That is, the analyzer 436 outputs the phase error value and the amplitude error value of the output signal of the input hybrid unit 406 to the correcting unit 410, by comparing the sampled I signals and Q signals.

For example, the analyzer 436, as illustrated in FIG. 5, calculates the phase error value and the amplitude error value of the output signal of the input hybrid unit 406, by comparing the sampled I signal and Q signal, that is, the QPSK signal, the sine signal, and the cosine signal output from the modulator 432, with the sampled I signal and Q signal output from the demodulators 433 and 434, that is the QPSK signal, the sine signal, and the cosine signal, as illustrated in FIG. 6, respectively. In this configuration, the analyzer 436 calculates the phase error value of the output signal of the input hybrid unit 406 at 30 degrees and the amplitude error value as 2V, respectively.

Further, the correcting unit 410 includes phase regulators 412 and 414, for example, phase shifters configured to correct the phase error of the output signal of the input hybrid unit 406 by receiving the phase error value of the output signal of the input hybrid unit 406, and includes variable amplifiers 416 and 418 and VGAs configured to correct the amplitude error of the output signal of the input hybrid unit 406 by receiving the correction error value of the output signal of the input hybrid unit 406.

Further, the amplifiers 420 and 422 amplify input signals, in which the phase error and the amplitude error of the input signals to be amplified are corrected, at a predetermined level, and output the amplified input signals to the multi-output port, that is, the output port 1 440 and the output port 2 442 through the output hybrid unit 424. In this configuration, the output port 1 440 does not output the amplified signal of the input signal, because the signal having a magnitude of a half the amplified first signal output from the amplifier 1 420 and the same phase as the first signal and the signal having a magnitude of a half the amplified second signal output from the amplifier 442 and a phase difference of 90 degrees of the second signal have inverse phases to each other and are offset, thereby not outputting the amplified signal of the input signal. Further, the output port 2 440 does not output the amplified signal of the input signal, because the signal having a magnitude of a half the amplified first signal output from the amplifier 1 420 and a phase difference of 90 degrees from the first signal and the signal having a magnitude of a half the amplified second signal output from the amplifier 2 442 and the same phase as the second signal have the same phase and are reinforced, thereby outputting the reinforced signal as the amplified signal of the input signal.

As described above, the apparatus for multiport amplification according to an embodiment of the present invention calculates the phase error and the amplitude error of the output signal of the input hybrid unit 406, by comparing the QPSK signal or the sine and cosine signals for the input signal of the input hybrid unit 406, that is, the sampled I signal and Q signal of the input signal of the input hybrid unit 406, with the input signal of the output hybrid unit 424, that is, the QPSK signal or the sine and cosine signal for the amplified signal output from the amplifiers 420 and 422, that is, the sampled I signal and Q signal of the input signal of the output hybrid unit 424.

Further, the apparatus for multiport amplification according to an embodiment of the present invention corrects the phase error and the amplitude error of the input signal through the phase error and the amplitude error calculated as described error before amplifying the input signal, and then amplifies and outputs the input signal of which the phase error and the phase error are corrected, through the multi-output port. Therefore, the apparatus for multiport amplification according to an embodiment of the present invention normally transmit/receive a signal through a multi-beam, by correcting the phase error and the amplitude error of the input signal, amplifying the input signal, and then output the input signal through the multi-output port, when amplifying the input signal input through the multi-input port in order to normally transmit/receive through a multi-beam. In particular, the apparatus for multiport amplification can easily and accurately correct the phase error and the amplitude error of the input signal by using error values, after separately calculating the error values of the phase error and the amplitude error of the input signal. Hereinafter, correcting the phase error and the amplitude error of a signal to be amplified in a communication system according to an embodiment of the present invention will be described in more detail with reference to FIG. 7.

Figure 7:
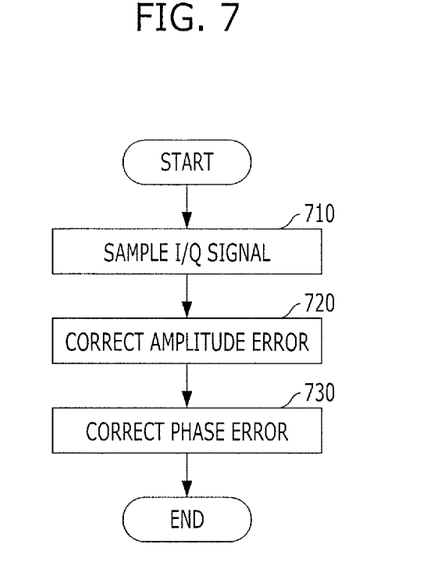
FIG. 7 is a diagram schematically illustrating the operation process of the apparatus for multiport amplification in a communication system in accordance with an embodiment of the present invention.

FIG. 7 is a diagram schematically illustrating the operation process of the apparatus for multiport amplification in a communication system in accordance with an embodiment of the present invention. Here, FIG. 7 is a view schematically illustrating a process that the apparatus for multiport amplification corrects the phase error and the amplitude error of an input signal when amplifying the signal input through the multi-input port.

Referring to FIG. 7, in step 710, the apparatus for multipart amplification, as described above, outputs an input signal input through the multi-input port and the amplified signal output from the amplifiers, as sampled I signal and Q signal, through the modulator and demodulators. That is, the apparatus performs sampling on the input signal input to the multi-input port, corresponding to the multiport amplification, in to an I signal and a Q signal, and performs sampling on the amplified signal in which the input signal is amplified through an amplifier, into an I signal and a Q signal.

Further, in step 720, the absolute values of the sampled I signal and Q signals are calculated and then the amplitude error value of the input signal is calculated by comparing the calculated absolute values, and the amplitude error of the input signal is corrected by the calculated amplitude error value.

Next, in step 730, axial ratios of the sampled I signal and Q signals are calculated and then the phase error value of the input signal is calculated by comparing the calculated axial ratios, and the phase error of the input signal is corrected by the calculated amplitude error value. Hereinafter, correcting the phase error and the amplitude error of a signal of the apparatus of multiport amplification in a communication system according to an embodiment of the present invention will be described in more detail with reference to FIGS. 8 to 16.

FIGS. 8 to 16 are diagrams illustrating connection of a phase error and an amplitude error in the apparatus for multiport amplification in a communication system in accordance with an embodiment of the present invention.

Referring to FIGS. 8 to 16, as described above first, the apparatus for multiport amplification detects the phase error and the amplitude error of the input signal, by comparing the input signal of the input hybrid unit, that is, the QPSK signal or a cosine signal and a sine signal for the sampled I signal and Q signal of the input signal input to the multi-input port of the apparatus for multiport amplification, with the input signal of the output hybrid unit, that is, the QPSK signal or the cosine signal or the sine signal for the sampled I signal and Q signal of the amplified signal amplified by an amplifier of the apparatus for multiport amplification.

Figure 8:
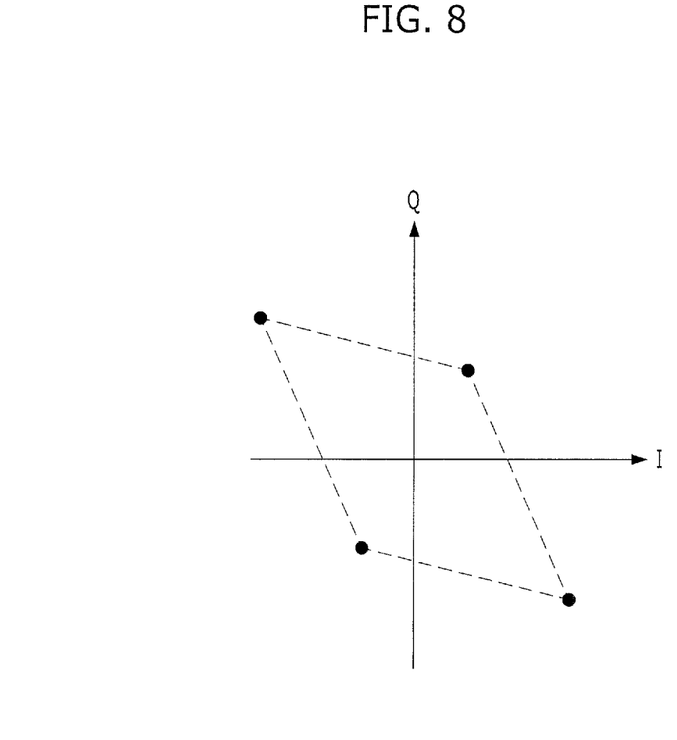
FIGS. 8 to 16 are diagrams illustrating correction of a phase error and an amplitude error in the apparatus for multiport amplification in a communication system in accordance with an embodiment of the present invention.
Figure 9:
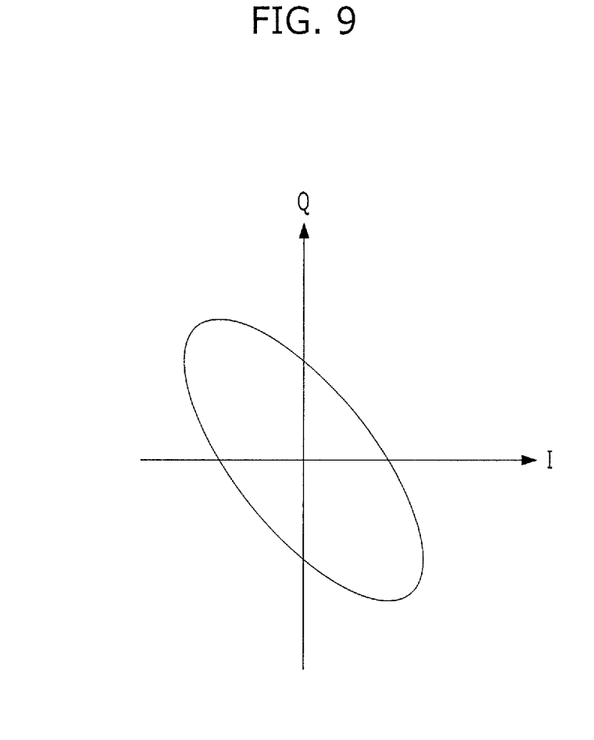
Figure 10:
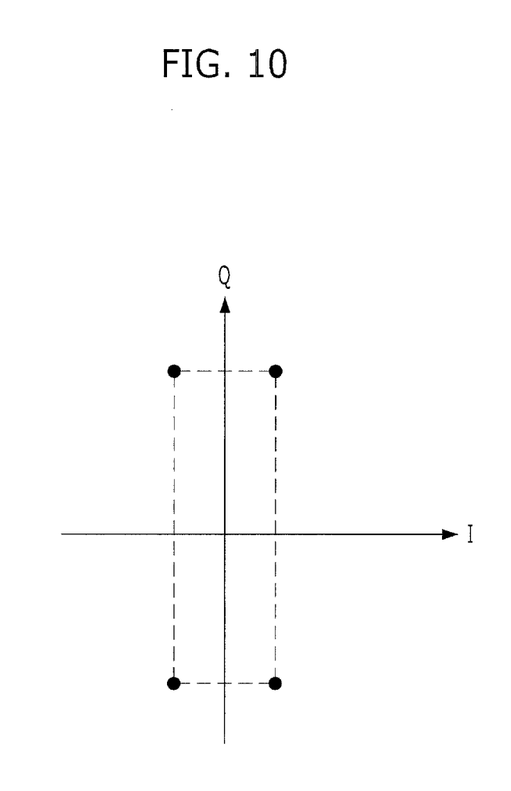
Figure 11:
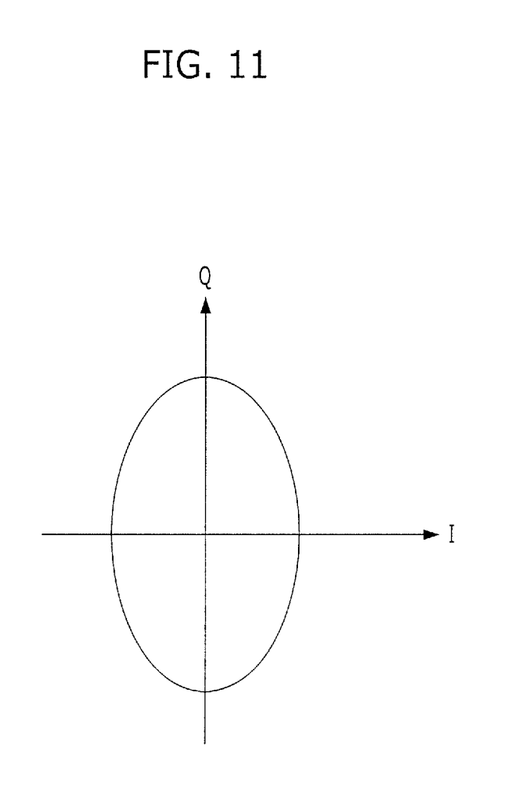
Figure 12:
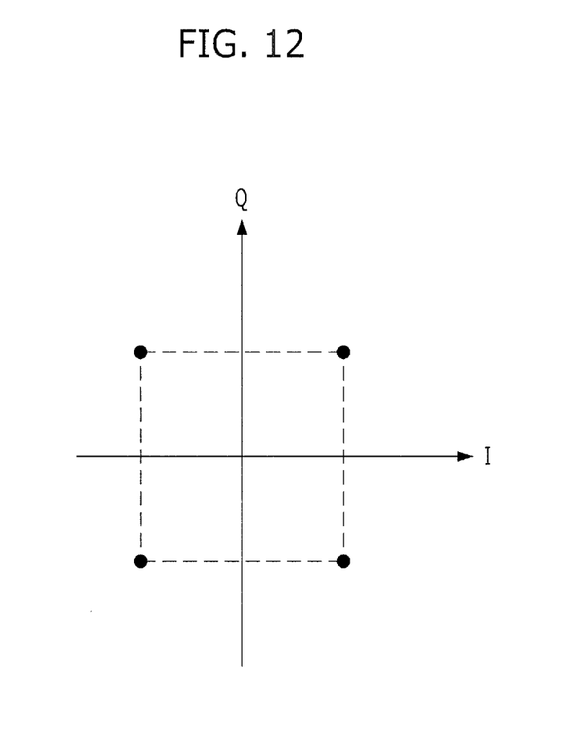
Figure 13:
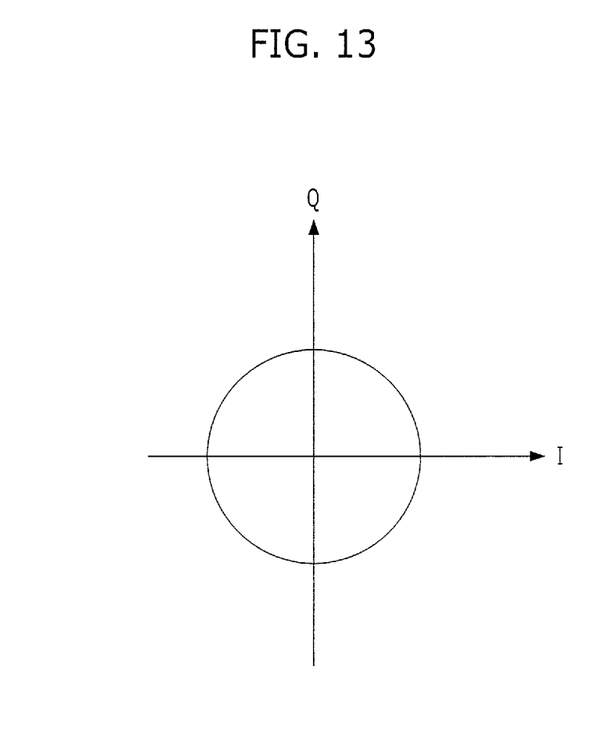

That is, the apparatus for multiport amplification calculates the phase error value by detecting the phase error of the input signal through the QPSK signals of the I signal and the Q signal as illustrated in FIG. 8, and calculates the phase error value by detecting the phase error of the input signal through the sine signals of the I signal and the Q signal as illustrated in FIG. 9. Further, the apparatus for multiport amplification calculates the amplitude error value by detecting the amplitude error of the input signal through the QPSK signals of the I signal and the Q signal as illustrated in FIG. 10, and calculates the amplitude error value by detecting the amplitude error of the input signal through the sine signals of the I signal and the Q signal as illustrated in FIG. 11. Further, the apparatus for multiport amplification corrects the phase error and the amplitude error of the input signal through the phase error value and the amplitude error value calculated as described above, amplifies the input signal in which the phase errors and the amplitude errors of the QPSK signals of the I signal and the Q signal are corrected, as illustrated in FIG. 12, and amplifies the input signal in which the phase errors and the amplitude errors of the sine signals of the I signal and the Q signal are corrected, as illustrated in FIG. 13. Herein, FIGS. 8 and 9 are diagrams illustrating the phase error of an input signal, FIGS. 10 and 11 are views illustrating the amplitude error of the input signal of FIG. 11, and FIGS. 12 and 13 are diagrams showing an input signal of which the phase error and the amplitude error are corrected.

Figure 14:
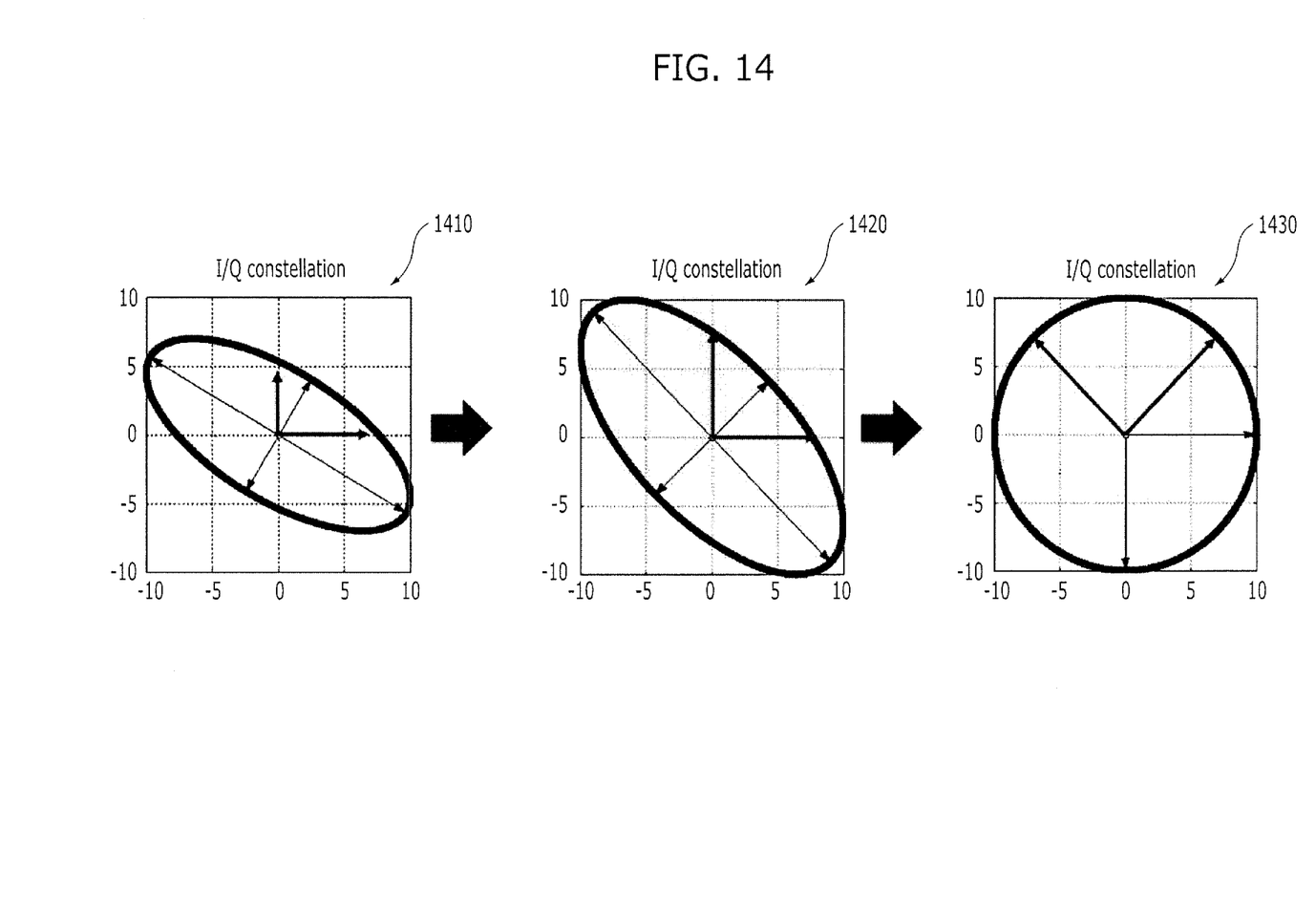

That is, the apparatus for multipart amplification calculates the phase error value and the amplitude error value of the input signal having a phase error and an amplitude error, as illustrated in 1410 of FIG. 14, corrects the amplitude error of the input signal by the amplitude error value, as illustrated in 1420 of FIG. 14, and then corrects the phase error of the input signal of which the amplitude error is corrected by the phase error value, as illustrated in 1430 of FIG. 14. Herein, FIG. 14 is a diagram illustrating the constellation for the I signal and the Q signal of the input signal, in which 1410 indicates the constellation for the I signal and the Q signal of an input signal having a phase error and an amplitude error, 1420 indicates the constellation for the I signal and the Q signal of the input signal of which the amplitude error is corrected, and 1430 indicates the constellation for the I signal and the Q signal of the input signal of which the phase error, in addition to the amplitude error, is corrected.

Figure 15:
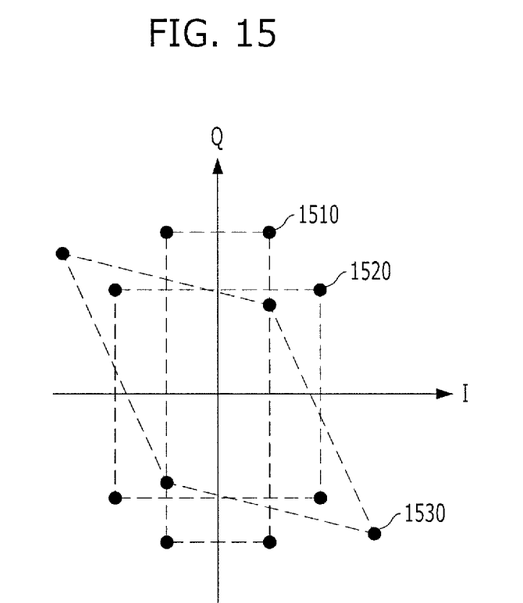

Further, the apparatus for multiport amplification corrects the amplitude error of the input signal illustrated in 1510 of FIG. 15, corrects the phase error of the input signal illustrated in 1530 of FIG. 15, amplifies the input signal of which the phase error and the amplitude error are corrected, as illustrated in 1520 of FIG. 15, and then outputs the input signal to the multi-output port. Herein, 1510 of FIG. 15 indicates the amplitude error for the I signal and the Q signal of the input signal, 1530 of FIG. 15 indicates the phase error for the I signal and the Q signal of the input signal, and 1520 of FIG. 15 indicates the constellation for the I signal and the Q signal of the input signal of which the phase error and the amplitude error are corrected.

Figure 16:
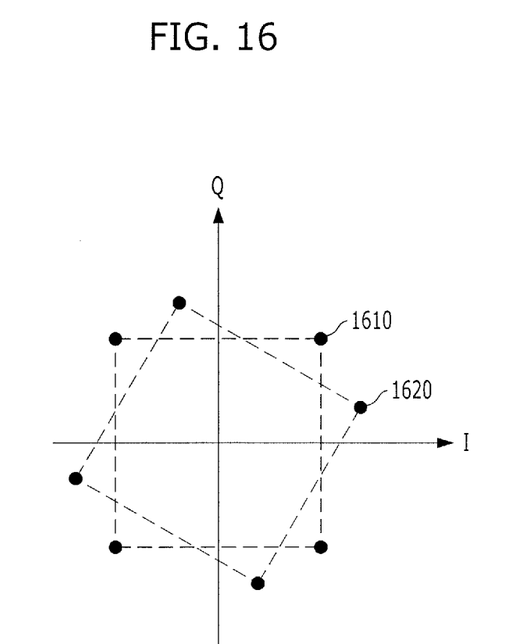

Further, when the apparatus for multiport amplification amplifies the input signal of which the phase error and the amplitude error are corrected and then demodulating the amplified signal through demodulators, as described above, the phase 1620 of the signal demodulated by a phase delay can rotate within 360 degrees of the phase 1610 of the input signal of which the phase error and the amplitude error are corrected, in which the apparatus for multipart amplification corrects the phase rotation due to the phase delay through delay correction using the analyzer. That is, the analyzer of the apparatus for multiport amplification corrects the phase 1620 of the input signal rotated in accordance with the phase delay into the phase 1610 of the input signal of which the phase error and the amplitude error are corrected, by correcting the phase rotation through delay correction.

Meanwhile, although detailed embodiments are described in the specification of the present invention, it should be understood that the present invention may be modified in various ways without departing from the scope of the present invention. Accordingly, such modifications, additions and substitutions should also be understood to fall within the scope of the present invention.

What is claimed is:

1. An apparatus for multiport amplification configured to amplify a signal in a communication system, the apparatus comprising:
    an amplifying unit configured to amplify an input signal input through a multi-input port and output the amplified signal to a multi-output port, in order to normally transmit and receive the signal by using a multi-beam;
    a calculating unit configured to detect a phase error and an amplitude error of the input signal and calculate a phase error value and an amplitude error value of the input signal; and
    a correcting unit configured to correct the phase error and the amplitude error of the input signal through the phase error value and the amplitude error value of the input signal,
    wherein the amplifying unit amplifies the input signal of which the phase error and the amplitude error are corrected, and outputs the input signal to the multi-output port,
    wherein the calculating unit detects the phase error and the amplitude error of the input signal by comparing sampled I signal and Q signal of the input signal with sampled I signal and Q signal of the amplified signal.

2. The apparatus of claim 1, wherein the calculating unit detects the phase error and the amplitude error of the input signal through modulated signal for the I signals and the Q signals.

3. The apparatus of claim 1, wherein the calculating unit detects the phase error and the amplitude error of the input signal through sine signals and cosine signals for the 1 signals and the Q signals.

4. The apparatus of claim 1, wherein the calculating unit calculates the amplitude error value of the input signal by calculating the absolute values of the 1 signal and the Q signals and comparing the calculated absolute values.

5. The apparatus of claim 1, wherein the calculating unit calculates the phase error value of the input signal by calculating axial ratios of the I signals and the Q signals and comparing the calculated axial ratios.

6. The apparatus of claim 1, wherein the calculating unit includes:
    a modulator configured to output the sampled I signal and Q signal of the input signal by modulating the input signal;
    a demodulator configured to output the sampled I signal and Q signal of the amplified signal by demodulating the amplified signal; and
    an analyzer configured to detect the phase error and the amplitude error of the input signal through the I signals and the Q signals and calculate the phase error value and the amplitude error value of the input signal.

7. The apparatus of claim 6, wherein the modulator modulates the input signal in a QPSK (Quadrature Phase Shift Keying) modulation type and outputs a QPSK signal, or a sine signal and a cosine signal, for the sampled I signal and Q signal of the input signal.

8. The apparatus of claim 6, wherein the demodulator demodulates the amplified signal in a BPSK (Binary Phase Shift Keying) demodulation type and outputs a QPSK (Quadrature Phase Shift Keying) signal, or a sine signal and a cosine signal, for the sampled I signal and Q signal of the amplified signal.

9. The apparatus of claim 6, wherein the analyzer calculates the amplitude error value of the input signal by calculating the absolute values of the I signal and the Q signals and comparing the calculated absolute values.

10. The apparatus of claim 6, wherein the analyzer calculates the phase error value of the input signal by calculating axial ratios of the I signals and the Q signals and comparing the calculated axial ratios.

11. The apparatus of claim 6, wherein the analyzer corrects a phase rotation of the input signal of the phase error and the amplitude error due to a phase delay are corrected, through delay correction.

12. A method for multiport amplification configured to amplify a signal in a communication system, the method comprising:
    amplifying an input signal input through a multi-input port, in order to normally transmit and receive the signal by using a multi-beam;
    detecting a phase error and an amplitude error of the input signal, and then calculating a phase error value and an amplitude error value of the input signal;
    correcting the phase error and the amplitude error of the input signal through the phase error value and the amplitude error value of the input signal; and
    amplifying the input signal of which the phase error and the amplitude error are corrected, and outputting the input signal to a multi-output port,
    wherein the calculating detects the phase error and the amplitude error of the input signal by comparing sampled I signal and Q signal of the input signal with sampled I signal and Q signal of the amplified input signal.

13. The method of claim 12, wherein the calculating detects the phase error and the amplitude error of the input signal through modulated signal for the I signals and the Q signals.

14. The method of claim 12, wherein the calculating detects the phase error and the amplitude error of the input signal through sine signals and cosine signals for the I signals and the Q signals.

15. The method of claim 12, wherein the calculating calculates the amplitude error value of the input signal by calculating the absolute values of the 1 signal and the Q signals and comparing the calculated absolute values.

16. The method of claim 12, wherein the calculating calculates the phase error value of the input signal by calculating axial ratios of the I signals and the Q signals and comparing the calculated axial ratios.

17. The method of claim 12, wherein the calculating modulates the input signal in a QPSK (Quadrature Phase Shift Keying) modulation type and generates a QPSK signal, or a sine signal and a cosine signal, for the sampled I signal and Q signal of the input signal.

18. The method of claim 12, wherein the calculating demodulates the amplified input signal in a BPSK (Binary Phase Shift Keying) demodulation type and generates a QPSK (Quadrature Phase Shift Keying) signal, or a sine signal and a cosine signal, for the sampled I signal and Q signal of the amplified input signal.

\* \* \* \* \*